United States Patent
Nguyen et al.

(10) Patent No.: US 6,651,079 B1
(45) Date of Patent: Nov. 18, 2003

(54) HIGH SPEED PIPELINE MULTIPLIER WITH VIRTUAL SHIFT

(75) Inventors: Han Quang Nguyen, Allentown, PA (US); Manosha S. Karunatilaka, Marlborough, MA (US)

(73) Assignee: Agere Systems Inc., Allentown, PA (US)

( * ) Notice: Subject to any disclaimer, the term of this patent is extended or adjusted under 35 U.S.C. 154(b) by 506 days.

(21) Appl. No.: 09/618,172

(22) Filed: Jul. 18, 2000

(51) Int. Cl.[7] .................................................. G06F 7/52
(52) U.S. Cl. ....................................................... 708/627
(58) Field of Search ................................. 708/627, 631, 708/626, 625

(56) References Cited

U.S. PATENT DOCUMENTS

| | | | | |
|---|---|---|---|---|
| 4,970,676 A | * | 11/1990 | Fling | ........................... 708/627 |
| 5,528,531 A | * | 6/1996 | Toyama et al. | ............. 708/627 |
| 6,144,980 A | * | 11/2000 | Oberman | ..................... 708/627 |
| 6,263,357 B1 | * | 7/2001 | Choe | ........................... 708/627 |

* cited by examiner

Primary Examiner—David H. Malzahn
(74) Attorney, Agent, or Firm—Synnestvedt & Lechner LLP

(57) ABSTRACT

Disclosed is a method and apparatus for accomplishing high speed multiplication of binary numbers using a single clock cycle to achieve the same computational power provided by the multiple clock cycle shift register configurations or the asynchronous multistate logic configurations of the prior art. "Virtual shifts" are achieved by allocating one or more positions, within a register storing the partial products, as place holders, typically zeroes. These place holders can be inserted in a single clock cycle and do not require the multi-staged shift register configurations of the prior art.

12 Claims, 3 Drawing Sheets

HIGH SPEED PIPELINE MULTIPLIER WITH VIRTUAL SHIFT

FIELD OF THE INVENTION

The present invention relates to binary multipliers; and more particularly, to an improved pipeline multiplier and multiplying method.

BACKGROUND OF THE INVENTION

The multiplication of binary numbers is an inherent part of the operation of any digital system. The multiplication of two binary numbers is performed in essentially the same manner as the multiplication of decimal numbers, by taking the product of a multiplicand and a multiplier. With binary numbers, this process consists of examining the successive bits of a multiplier, beginning with the least significant bit ("LSB") of the multiplier. If the multiplier bit is a "1", the multiplicand is recorded as a first partial product (assuming that the multiplier is more than a single digit binary number); if the multiplier bit is a "0", zeroes are recorded as the first partial product. Moving from the LSB to the most significant bit (MSB) of the multiplier, each multiplier bit is examined in this manner. In a well known manner, each of the partial products recorded in successive lines are shifted one bit position to the left relative to the previous line.

When all of the multiplier bits have been examined and the partial products placed in appropriate alignment by the shifting process, the partial products in the successive lines are added to produce a final product. The purpose of the shifting step described above is to take into account the decimal position of the multiplier bit being examined, to properly align each of the successive partial products. Each partial product is shifted to the left by the number of bits corresponding to the bit position of the multiplier bit in question.

The following calculation llustrates: the above-described multiplication process using a multiplier of 1001 and a multiplicand of 1011:

|  |  |
|---|---|
| 1001 | multiplicand |
| x 1011 | multiplier |
| 1001 |  |
| 1001 | partial |
| 0000 | products |
| 1001 |  |
| 1100011 | final product |

Devices for performing multiplication, called "multipliers," are well known. Typically, multipliers are either "synchronous" (performing each of the operations which result in the final product in a synchronized manner according to a timing sequence controlled by the operation of a clock) or "asynchronous" (performing the operations which result in the final product without synchronization and thus without the need for control by a clock).

In a typical synchronous multiplier, each bit of the multiplicand is individually multiplied by each bit of the multiplier, with the result of the multiplication being stored in a register. This arrangement is known in the art as a "synchronous shifter and adder." Shift registers are employed so that, with each successive multiplier bit, the partial product corresponding to the bit position of the multiplier bit is physically shifted and place holders (typically zeroes) are inserted (i.e., clocked in) in the positions vacated by the shifting process. Once each multiplier bit has been utilized to obtain all of the partial products, the now properly aligned partial products are added to result in the final product.

Because of the numerous shift steps required to perform multiplication using a to synchronous shifter and adder, many clock cycles are consumed during the shifting and adding operations, thereby slowing down the overall multiplication process. In addition, the shift registers increase the physical size of the multiplier, which is undesirable in an age where miniaturization is the focus of most circuit designers.

Asynchronous multipliers utilize multistage logic circuits (e.g., AND OR gates) to perform the multiplication processes. The use of multistage logic circuits eliminates the need to obtain partial products and thus alignment is not an issue. Further, since there are no synchronous elements such as flip flops, there is no clocking control required. However, asynchronous multipliers require large numbers of ASIC gates. For example, for an asynchronous 4×4 multiplier (i.e., one capable of obtaining the product of two 4-bit numbers) approximately 44 ASIC cells are needed. This increases the size of the multiplier and significantly slows down its operation.

Accordingly, it would be desirable to have a synchronous binary multiplier in which all of the required place holders are assigned or inserted via a single "virtual shift" clock cycle without the need to employ shift registers.

SUMMARY OF THE INVENTION

It is an object of the present invention to accomplish high speed multiplication of binary numbers using a single clock cycle to achieve the same computational power provided by the multiple clock cycle shift register configurations or the asynchronous no multistate logic configurations of the prior art.

In accordance with the present invention, instead of serially multiplying each bit of the multiplicand individually by each bit of the multiplier, and shifting each successive product to properly align the partial products prior to the final adding step, "virtual shifts" are achieved by allocating one or more positions, within a register storing the partial products, as place holders, typically zeroes.

In one embodiment, the present invention comprises a method for properly aligning partial products stored in registers in connection with the multiplication of binary numbers, comprising the steps of: determining a quantity of place holders required to properly align the partial products; determining the appropriate position in the registers for each of the place holders; and assigning place holders to the appropriate place holder positions.

In another embodiment, the present invention is a method for multiplying an X-bit binary multiplicand M by a Y-bit multiplier N, comprising the steps of: separately multiplying each bit of the multiplicand M by all of the bits of the multiplier N to produce Y partial products; storing each of the partial products in a separate (X+1) bit register, wherein one of the bit positions of each of the (X+1) bit registers is permanently set at zero; adding the stored partial products in pairs by first grouping the (X+1) bit registers into adjacent pair groups, beginning with the (X+1) bit register corresponding to the least significant bit (LSB) of the multiplier N, and then adding the two partial products stored in each adjacent pair group; storing the results of each added partial product pairs in a separate (X*2) bit register, wherein (Y−2) of the bit positions of each of the (X*2) bit registers are permanently set at zero; adding the values stored in the (X*2) bit registers; and outputting the added values stored in the (X*2) bit registers as the product of M*N.

In a further embodiment, the present invention comprises a multiplier for multiplying an X-bit binary multiplicand M by a Y-bit multiplier N, comprising: a first one-bit multiplier separately multiplying the multiplicand M by each bit of the multiplier N and outputting a first group of partial products; storage means for storing the first group of partial product; dividing means for dividing the first group of partial products into pairs; adding means for adding the partial products comprising each of the pairs together; storage means for storing the added partial product pairs together as a second group of partial products; and adding the second group of partial products together to produce the product of M*N.

The present invention will now be described with reference to the following drawings, in which like reference numbers denote the same element throughout.

DETAILED DESCRIPTION OF THE PREFERRED EMBODIMENT

Figure 1:
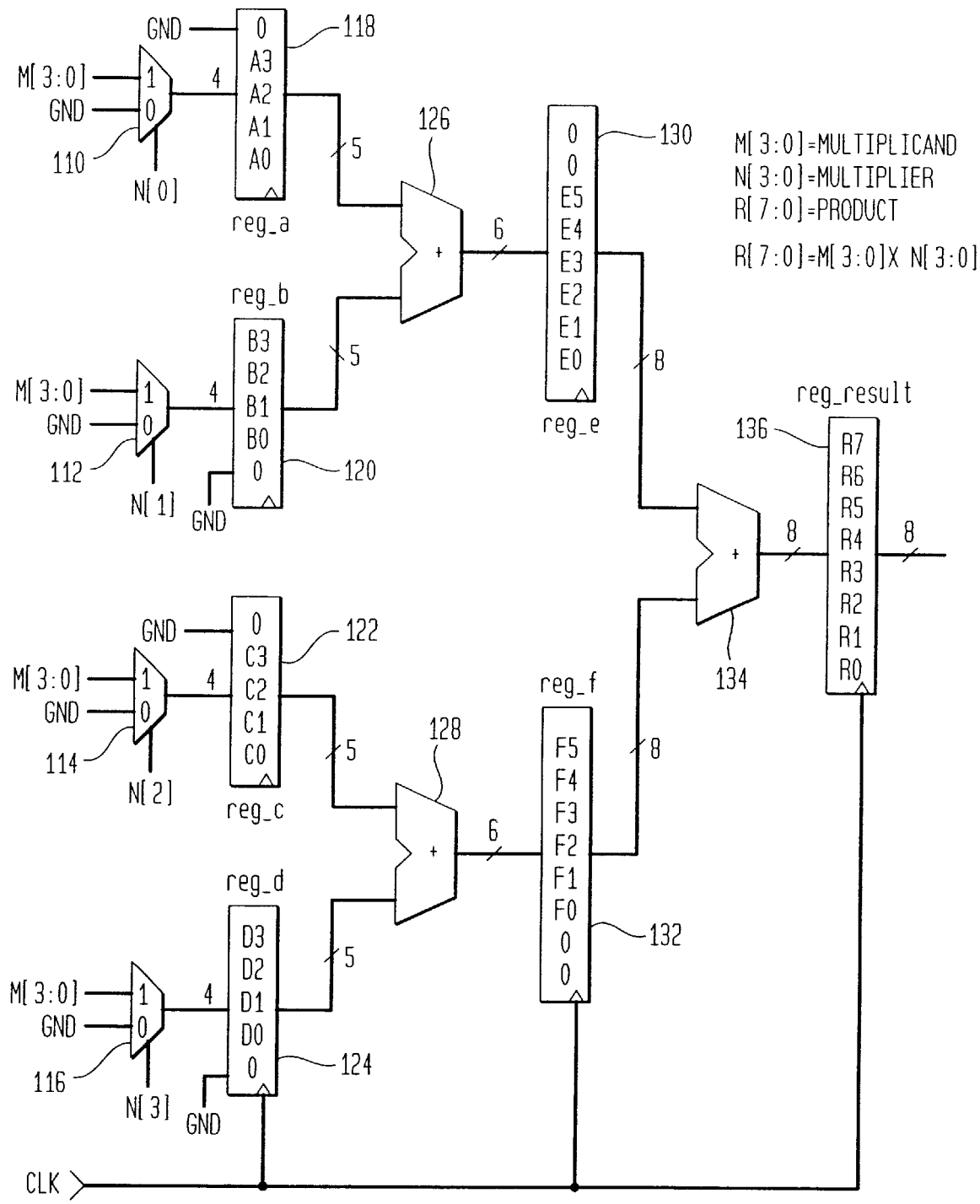
FIG. 1 illustrates a hardware configuration of a 4-bit×4-bit multiplier which operates in accordance with the present invention.

FIG. 1 illustrates a hardware configuration exemplifying a preferred embodiment of the present invention. For clarity of explanation, the description below in connection with FIG. 1 is directed to an example in which a four bit multiplier renders an eight bit result; it is understood, however, that the present invention is not so limiting and a multiplier of any size may be used as long as appropriate hardware is provided to support the multiplier size. For this example, a multiplier N has a value 1011 and a multiplicand M has a value 1001. Referring to FIG. 1, multiplexers 110, 112, 114 and 116 are provided; the exact number of multiplexers required corresponds to the number of bits in the multiplier N. In this example, the output of each multiplexer 110, 112, 114 and 116 will be either a four bit binary number corresponding to the multiplicand M input to the multiplexer or a ground signal which, as described below, will cause a series of four zeroes to be stored in a register to represent the product of the multiplicand and zero.

The selection between which of the two outputs (the multiplicand M or ground) is determined by the value of the particular bit of the multiplier N applied to a control input C of each multiplexer. Typically, binary numbers are assigned bit positions starting with bit 0, from right to left, i.e., the right-most bit of a multiplier N is considered bit N[0], the bit immediately to the left of bit N[0] is bit N[1], the next bit to the left is bit N[2], and so on. As shown in FIG. 1, multiplexer 110 is associated with the multiplier bit N[0]; multiplexer 112 is associated with the multiplier bit N[1]; multiplexer 114 is associated with multiplier bit N[2]; and multiplexer 116 is associated with multiplier bit N[3]. In accordance with the protocol described above, if multiplier bit N[0]=1, then the output of multiplexer 110 will be 1011, and if multiplier bit N[0]=0, then the output of multiplexer 110 will be a ground signal.

The output of multiplexers 110, 112, 114, and 116 are input to a first stage register level comprising five-bit registers 118, 120, 122, and 124, respectively. In addition to receiving the output from the multiplexers, each five-bit register 118, 120, 122, and 124 has a permanently grounded input for its fifth bit. Thus, for example, five-bit register 118 always has a 0 located at the left bit position, and register 120 always has a 0 located at the right bit position. These zeroes effectively insert the zeroes needed for proper alignment as discussed above. Therefore, without the need to provide clock cycles to shift the partial products for proper alignment, the appropriate spacing is always provided.

In accordance with the present invention, pipeline processing is utilized to divide up the processing steps and thus take advantage of the speed associated with processing the divided steps in parallel. As can be seen in FIG. 1, the outputs from five-bit registers 118 and 120 are summed by adder 126. Likewise, the outputs from five-bit registers 122 and 124 are summed by adder 128. Adders 126 and 128 are six-bit adders, and the result of the addition performed by adders 126 and 128 is input to eight-bit registers 130 and 132, respectively. The two left-hand bit inputs of eight bit register 130 are permanently grounded as are the two right-hand bit inputs of eight bit register 132, thereby providing the appropriate spacing when the two partial products are added, as described below.

Registers 130 and 132 respectively store the partial products resulting from the multiplication of the first two bits (bits N[0] and N[1]) of the multiplier by the multiplicand M and the second two bits (bits N[2] and N[3]) of the multiplier by the multiplicand M, and the final summing step takes place via adder 134. Adder 134 combines the properly aligned outputs of registers 130 and 132 and outputs them to an eight bit results register 136. Thus, results register 136 will contain the complete product of the multiplicand M and the multiplier N, derived without the need for the shift register cycles (and shift register hardware) required of the prior art.

The mathematical calculations of this example, performed using a "pencil and paper" method, are performed as follows. Using the multiplier N=1011 and the multiplicand M=1001 as mentioned above, the multiplier N is first subdivided into two-bit segments by dividing it down the middle so that two-bit segments, "10" and "11", are derived. Next, a simple two-bit multiply operation is performed on the subdivided multiplier by separately multiplying the multiplicand M, which is equal to 1001, by the two-bit multiplier segments, shifting the second partial product as shown:

|  |  |
|---|---|
| 1001 | 1001 |
| × 10 | × 11 |
| 0000 | 1001 |
| 1001 | 1001 |
| 10010 | 11011 |

The result of this two-bit multiplication are two partial products, 10010 and 11011. To complete the multiplication, the two partial products are then added, this time with the second product shifted by two decimal places, as follows:

```
       11011
       10010
     _____
      1100011
```

The above calculation carried out by the present invention occurs as follows:

In a first step, corresponding to the first clock cycle, the individual bits of multiplier N, collectively 1011, are loaded into multiplexers 110, 112, 114, and 116 via control inputs C. The left-most bit of the multiplicand is bit N[3], the bit to the right of bit N[3] is bit N[2], the bit to the right of bit N[2] is bit N[1], and the bit to the right of bit N[1] is bit N[0]; thus a 1 (corresponding to bit N[1] of multiplier N) will be input to the control input C of multiplexer 110 (N[0]=1) thereby causing multiplexer 10 to output the multiplicand 1001 to bit positions A3, A2, A1, and A0 of the five bit register 118. Similarly, a 1 (corresponding to bit N[1] of multiplier N) is input to the control input C of multiplexer 112 resulting in the multiplicand 1001 being loaded into bit positions B3, B2, B1, and B0, respectively, of five bit register 120.

The control bit applied to the control input C of multiplexer 114 will be a zero, corresponding to bit N[2] of the multiplier 1011. This causes the multiplexer to output a ground signal which is applied to bit positions C3, C2, C1, and C0 of five bit register 122, thereby setting them each to zero. Multiplexer 116, receiving bit N[3] of the multiplier N (i.e., a 1) at its control input C, like multiplexers 110 and 112, outputs the multiplicand 1001 to bit positions D3, D2, D1, and D0, respectively.

Since the zero bit position (designated by "GND" in FIG. 1) of each of the registers 118, 120, 122, and 124 are permanently grounded, they will always be "loaded" with a zero. This accomplishes the "virtual shifting" of the present invention, since the zeroes are concatenated to the appropriate position in each register. The action is called "virtual shifting" because no actual shift occurs and thus no clock pulses for shifting are required. Thus, register 118 will contain a "0" and "1001" and register 120 will contain "1001" and "0" (based on the "11" segment of multiplier N); and register 122 will contain "0" and "0000" and register 124 will contain "1001" and "0" (based on the "10" segment of multiplier N).

In the second step, during the second clock cycle, registers 118 and 120 output their contents to adder 126, and simultaneously registers 122 and 124 output their contents to adder 128. The results of the additions performed by adders 126 and 128 are placed in registers 130 and 132, respectively, which registers comprise a second stage register level. The following calculations illustrate the addition step performed during the second clock cycle:

```
    reg_18 =      01001
    reg_20 =     10010 +
    reg_30 =  00 & 011011 reg_22 =      01001
    reg_24 =     10010 +
    reg_32 =  010010 & 00
```

The results of the calculations are input into register 130 and register 132, and the two decimal places are accommodated for via the grounding bit positions of registers 130 and 132. As noted above, these two shifts are required because the least significant bit portion of a two bit multiplier requires the two place holders. Since the two zeroes are preset in each of the registers, there is no need for a shifter or the clock cycling required to effect the shift as is used in the prior art.

In step 3, during the third clock cycle, the contents of register 130 and register 132 are added via adder 134 and the result is placed in the results register 136:

```
      reg_30 = 00011011
      reg_32 = 01001000
   resultreg_36 = 01100011
```

The final result is stored in the results register 136 and, optionally, with a fourth clock cycle, can be output to a memory or output onto a data bus.

As can be seen, there is a latency of three clock cycles during the first multiplication performed by the multiplier; however, once the initial latency period has expired (i.e., when three complete clock cycles have occurred) the multiplier will function on each successive clock cycle. The resulting multiplier is less complex, less costly, and smaller in size than prior art multipliers.

While illustrated as a four bit multiplier, the present invention is not limited to four bits. Any size multiplier may be used; in the preferred embodiment, for the sake of simplicity, the multiplier should have an even number of bits to facilitate the dividing of the multiplier into pairs. If the multiplier has an odd number of bits, an additional multiplexer and register, permanently set to output a ground signal/zeroes, can be utilized at the last position to "convert" the multiplier into an even-bit multiplier.

Figure 2:
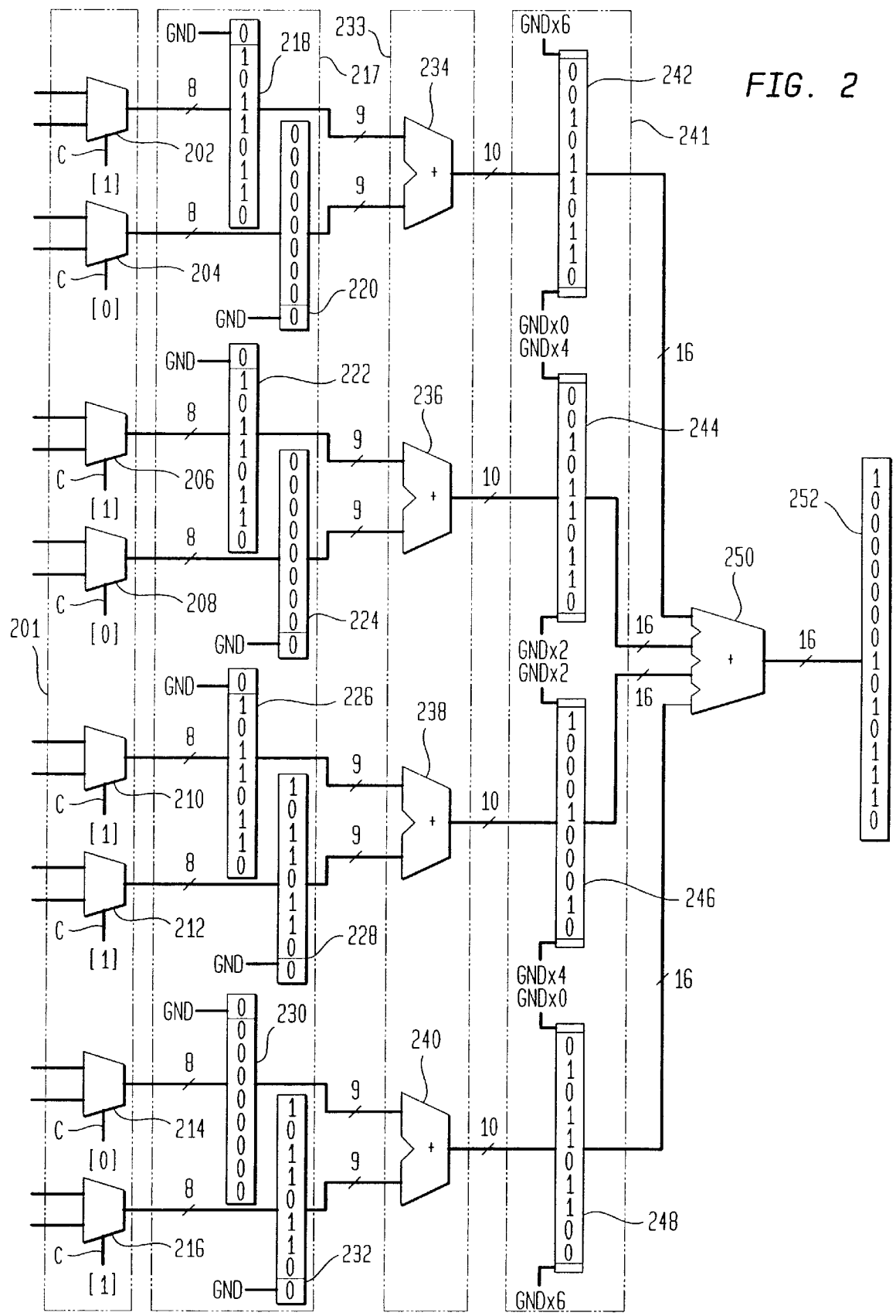
FIG. 2 illustrates a hardware configuration of an 8-bit×8-bit multiplier which operates in accordance with the present invention.

FIG. 2 illustrates an example of an 8-bit multiplier being utilized to multiply an 8-bit multiplicand by an 8-bit multiplier. In this example, the 8-bit multiplicand M is 10110110 and the 8-bit multiplier N is 10110101.

As shown in FIG. 2, a multiplexing device 201, comprising eight multiplexers 202, 204, 206, 208, 210, 212, 214, and 216, is provided. As in the previous example, the output of each multiplexer 202, 204, 206, 208, 210, 212, 214, and 216 will be either a binary number corresponding to the multiplicand M input to the multiplexer or a ground signal which will generate a string of zeroes corresponding in number to the number of bits in the multiplicand.

As with the previous example, the selection between which of the two outputs (the multiplicand M or ground) is determined by the value of the particular bit of the multiplier N applied to a control input C of each multiplexer. As shown in FIG. 2, beginning with the LSB of multiplier N, the bits of the multiplier are applied to the control inputs C of each of the multiplexers 202, 204, 206, 208, 210, 212, 214, and 216, i.e., multiplexer 202 receives a 1, multiplexer 204 receives a 0, multiplexer 206 receives a 1, multiplexer 208 receives a 0, multiplexer 210 receives a 1, multiplexer 212 receives a 1, multiplexer 214 receives a 0, and multiplexer 216 receives a 1. Those of the multiplexers receiving a 1 at control input C output the 8-bit multiplicand to the first stage register level, and those multiplexers receiving a 0 at control input C output a ground signal to the first stage register level. Specifically, a first storage device 217, comprising registers 218, 220, 222, 224, 226, 228, 230, and 232, is provided to receive the outputs from multiplexing device 201. Registers 218, 222, 226, 228, and 232 receive the multiplicand which is stored in the register as shown, and registers 220, 224, and 230 store zeroes for all positions of the register. As in the example of FIG. 1, the registers 218 through 232 each have a grounded input at either their LSB or MSB (as illustrated) position to provide the virtual shift feature of the present invention.

A pairing structure which divides the partial products output from the storage device 217 is formed by the interconnection of the outputs of storage device 217 to a first adding device 233, comprising adders 234, 236, 238, and 240. As in the previous example, the multiplier bits are paired, i.e., bit N[0] and bit N[1] are added by adder 234; bit N[2] and bit N[3] are added by adder 236; bit N[4] and bit N[5] are added by adder 238; and bit N[6] and bit N[7] are added by adder 240.

A second stage register level is provided, as in the previous example, and compres a second storage device 241 formed by registers 242, 244, 246, and 248 is also provided, as in the previous example. In the 8-bit application described with respect to FIG. 2, four second stage registers are required instead of only two. The positioning of the grounding bits among the four registers, which provide the zeroes for the virtual shifting of the present invention, is accomplished as follows.

First, the total number of zero bits to be applied must be calculated. This is a simple calculation achieved by subtracting two (one for each bit in the bit pairs) from the total number of bits in the multiplier, e.g., 8−2=6. Accordingly, each of the registers 242, 244, 246, and 248 will have six "zero-bit" locations in addition to the 10-bit output from the adders 234, 236, 238, and 240. The location of the "zero-bits" will vary from one register to the next, with the exact position determined as follows.

Figure 3A:
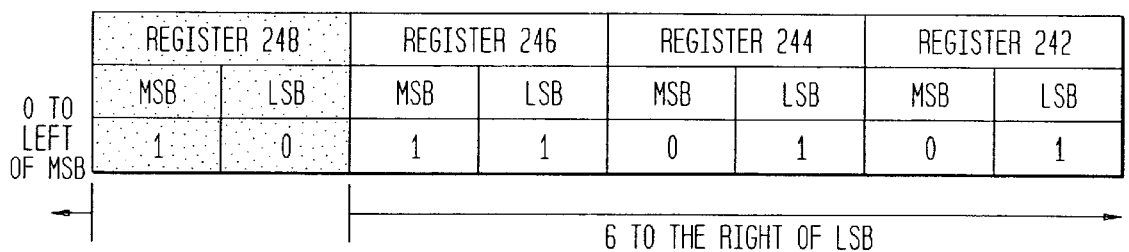
FIGS. 3A–3D are tables illustrating a method of determining the position of place holders in accordance with the present invention.
Figure 3B:
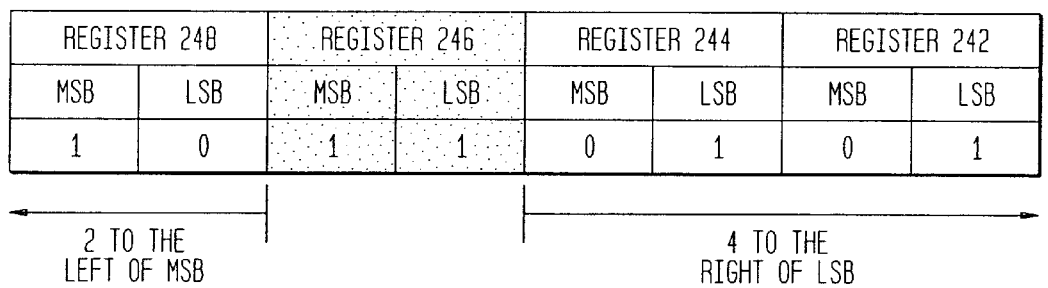
Figure 3C:
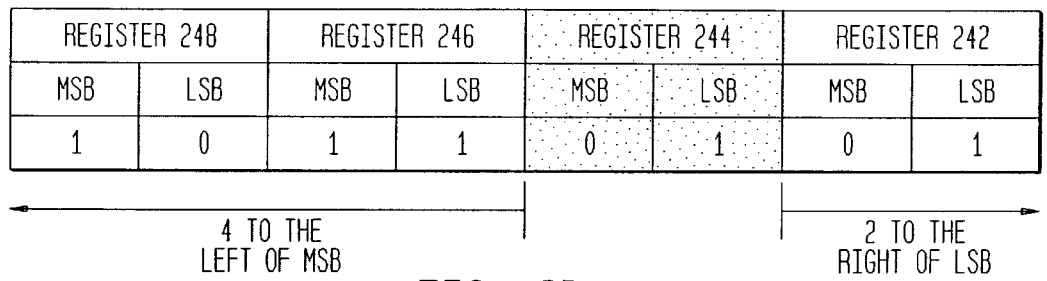
Figure 3D:
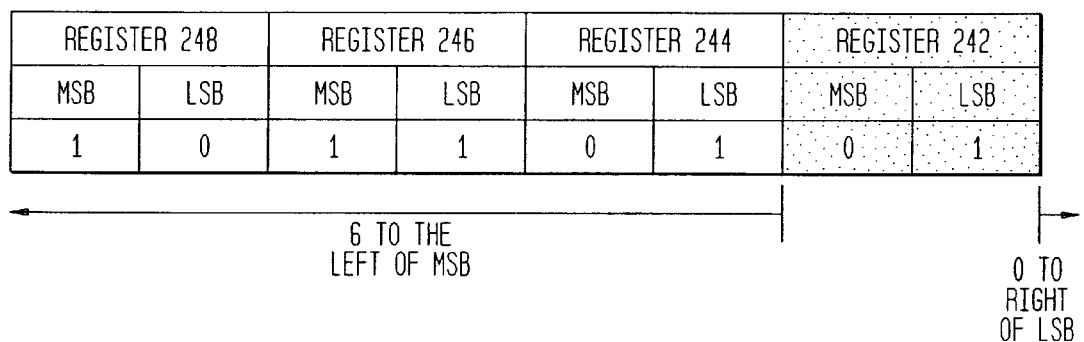

FIGS. 3A through 3D are tables utilized to illustrate the method of determining the positioning of the "zero-bits" with respect to registers 248, 246, 244, and 242, respectively. FIG. 3A is typical of all four tables 3A–3D. FIG. 3A includes a bottom column which contains the pairings of the multiplier 10110101 and the correlation of these pairings to each of the registers. The shaded portion of FIG. 3A indicates that FIG. 3A is directed to register 248. Each of the tables 3A through 3D identify an MSB and an LSB with respect to each of the pairs. Thus, for example, with respect to register 248 and the pair "10" of multiplier N associated therewith, the left digit, a "1", is identified as the MSB and the right digit, a "0", is identified as the LSB. Beginning with the MSB, the number of digits in the multiplier to the left of the MSB are counted which, with respect to register 248, is zero digits. This number indicates the number of "zero-bits" to be designated in front of, i.e., to the left of, the ten-bit output of adder 240. Next, the number of digits appearing to the right of the multiplier pair associated with register 248 are counted, indicating that there are six digits to the right thereof. This number identifies the number of "zero-bits" to be designated as zeroes following the ten-bit output of adder 240.

This same sequence is followed for all four registers. For example, with respect to FIG. 3B, there are two digits to the left of the MSB and four digits to the right of the LSB; thus, as shown in FIG. 2, there are two zero-bits designated to the left of the MSB of the ten-bit output of adder 238 and there are four zero-bits designated to the right of the LSB the ten-bit output of adder 238. This same process occurs for each of the registers until the zero-bits are designated as shown in FIG. 2. Once the zero-bits have been designated so that the numbers will be properly aligned, adder 250 simply adds the 16-bit outputs of each of the registers 242, 244, 246, and 248 to arrive at the result which is stored in results register 252.

By using the present invention, the shifting steps of the prior art are eliminated and high speed multiplication of numbers can be achieved by a single clock cycle (once the first three clock cycles have been executed) and the number ASIC gates is minimized since no hardware implementation of shifters is required. Thus, a faster, smaller, and more efficient multiplier is achieved.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

We claim:

1. A method for properly aligning partial products of binary numbers stored in registers in a multiplier device, comprising the steps of:

determining a quantity of place holders required to properly align the partial products;

determining appropriate positions in said registers for each of said place holders; and assigning place holders to the appropriate place holder positions in said registers.

2. The method as set forth in claim 1, wherein said assigning step includes at least the step of permanently grounding each of said place holder positions in said registers.

3. The method as set forth in claim 2, wherein said multiplier device multiplies an X-bit multiplicand M by a Y-bit multiplier N, and wherein said multiplier device includes a first register stage having Y registers, with each register of said first register stage having one bit-position reserved for one of said place holders, said step of determining the appropriate position in said registers of said first register stage comprising at least the steps of:

grouping said registers of said first register stage into adjacent pair groups, beginning with the register of said first register stage corresponding to the least significant bit (LSB) of said multiplier N;

for the first register of each of said adjacent pair groups, assigning a place holder to its LSB position; and for the second register of each of said adjacent pair groups, assigning a place holder to its most significant bit (MSB) position.

4. The method as set forth in claim 3, wherein said multiplier device further includes a second register stage having Y/2 registers, with each register of said second stage having Y−2 bit positions reserved for place holders, and wherein said step of determining the appropriate position in said registers of said second register stage comprises at least the steps of:

dividing said multiplier N into pairs corresponding to said adjacent pair groups and associating each pair with one of said second stage registers, with each of said multiplier pairs having an MSB and an LSB;

for each multiplier pair, determining a number of bits L of said multiplier N located to the left of the MSB of said multiplier pair and determining a number of bits R of said multiplier N located to the right of the LSB of said multiplier pair; and for each multiplier pair, designating L place holders as the MSB's of the second stage register associated with to said multiplier pair and designating R place holders as the LSB's of said second stage register associated with said multiplier pair.

5. A method for multiplying an X-bit binary multiplicand M by a Y-bit multiplier N, comprising the steps of:

separately multiplying each bit of said multiplier Y by all of said bits of said multiplicand M to produce Y partial products;

storing each of said partial products in a separate (X+1) bit register, wherein one of said bit positions of each of said (X+1) bit registers is permanently set at zero;

adding said stored partial products in pairs by first grouping said (X+1) bit registers into adjacent pair groups, beginning with said (X+1) bit register corresponding to the least significant bit (LSB) of said multiplier N, and then adding the two partial products stored in each adjacent pair group;

storing the results of each added partial product pairs in a separate (X*2) bit register, wherein (Y−2) of said bit positions of each of said (X*2) bit registers are permanently set at zero;

adding the values stored in said (X*2) bit registers; and outputting the added values stored in said (X*2) bit registers as the product of M*N.

6. The method as set forth in claim 5, wherein the first of the (X+1) bit registers of each of said adjacent pair groups has its LSB permanently set at zero and the second of the (X+1) bit registers of each of said adjacent pair groups has its most significant bit (MSB) permanently set at zero.

7. The method as set forth in claim 6, wherein the location of the permanent zero bit positions of the (X*2) bit registers are determined by performing the following steps:

dividing said multiplier N into pairs corresponding to said adjacent pair groups, with each of said multiplier pairs having an MSB and an LSB;

for each multiplier pair, determining the number of bits L of said multiplier N located to the left of the MSB of said multiplier pair and determining the number of bits R of said multiplier N located to the right of the LSB of said multiplier pair; and designating L zero bits as the MSB's of said (X*2) bit register corresponding to said multiplier pair and designating R zero bits as the LSB's of said (X*2) bit register corresponding to said multiplier pair.

8. A multiplying apparatus for multiplying an X-bit binary multiplicand M by a Y-bit multiplier N, comprising:

a multiplexing device separately multiplying said multiplicand M by each bit of said multiplier N and outputting a first group of partial products;

a first storage device storing said first group of partial products;

a pairing structure dividing said first group of partial products into pairs;

a first adding device adding together the partial products comprising each of said pairs;

a second storage device storing the added partial product pairs together as a second group of partial products; and a second adding device adding the second group of partial products together to produce the product of M*N.

9. A multiplying apparatus as set forth in claim 8, wherein said multiplexing device comprises Y multiplexers each having outputs coupled to said first storage device.

10. A multiplying apparatus as set forth in claim 9, wherein said first storage device comprises Y registers, one each coupled to said outputs of said Y multiplexers.

11. A multiplying apparatus as set forth in claim 10, wherein first adding device comprises Y/2 adders, each having plural inputs and an output, and wherein said pairing structure comprises the interconnection of pairs of said Y registers to said Y/2 adders via said plural inputs.

12. A multiplying apparatus as set forth in claim 11, wherein said second storage device comprises Y/2 registers coupled to the outputs of said Y/2 adders.

* * * * *